(12) United States Patent
Jia et al.

(10) Patent No.: US 10,371,512 B2
(45) Date of Patent: Aug. 6, 2019

(54) METHOD AND SYSTEM FOR MULTIPLE 3D SENSOR CALIBRATION

(71) Applicant: OTIS ELEVATOR COMPANY, Farmington, CT (US)

(72) Inventors: Zhen Jia, Shanghai (CN); Yanzhi Chen, Shanghai (CN); Hui Fang, Shanghai (CN); Arthur Hsu, South Glastonbury, CT (US); Alan Matthew Finn, Hebron, CT (US)

(73) Assignee: Otis Elevator Company, Farmington, CT (US)

( * ) Notice: Subject to any disclaimer, the term of this patent is extended or adjusted under 35 U.S.C. 154(b) by 316 days.

(21) Appl. No.: 15/094,007

(22) Filed: Apr. 8, 2016

(65) Prior Publication Data

US 2017/0292836 A1 Oct. 12, 2017

(51) Int. Cl.
| | |
|---|---|
| *B66B 5/00* | (2006.01) |
| *G06T 7/80* | (2017.01) |
| *G01B 21/04* | (2006.01) |
| *G01B 21/18* | (2006.01) |

(52) U.S. Cl.
CPC .......... *G01B 21/042* (2013.01); *G01B 21/18* (2013.01); *G06T 7/85* (2017.01); *B66B 5/0006* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 6,973,998 | B2 | 12/2005 | Deplazes et al. |
| 7,140,469 | B2 | 11/2006 | Deplazes et al. |
| 7,275,008 | B2 | 9/2007 | Plyvanainen |
| 7,712,586 | B2 | 5/2010 | Legez |
| 7,725,253 | B2 | 5/2010 | Foxlin |
| 7,725,279 | B2 | 5/2010 | Luinge et al. |
| 9,033,114 | B2 | 5/2015 | Mizon et al. |
| 9,052,201 | B2 | 6/2015 | Bentley et al. |
| 9,212,028 | B2 | 12/2015 | Novak et al. |

(Continued)

FOREIGN PATENT DOCUMENTS

| | | |
|---|---|---|
| CN | 104828664 A | 8/2015 |
| WO | 2010098756 A1 | 9/2010 |

(Continued)

OTHER PUBLICATIONS

European Search Report dated Aug. 4, 2017 for European Application No. 17165538.
Peter Eisert, "Model-based Camera Calibration Using Analysis by Synthesis Techniques", Jan. 1, 2003, XPO55395492.

(Continued)

*Primary Examiner* — Whitney Moore
(74) *Attorney, Agent, or Firm* — Bachman & LaPointe, P.C.

(57) ABSTRACT

A method for multiple 3D sensor calibration for a passenger conveyance system, the process including a computing a centroid location from spatial measurements for each of a pair of 3D sensors that form a common field of view via a moving object mathematical model; computing translation parameters from the locations of each centroid location; and correcting one of the pair of 3D sensors to a common world coordinate system from the translation parameters.

24 Claims, 5 Drawing Sheets

(56) References Cited

U.S. PATENT DOCUMENTS

| | | |
|---|---|---|
| 2006/0228050 A1 | 10/2006 | Xu et al. |
| 2010/0235129 A1 | 9/2010 | Sharma et al. |
| 2011/0200229 A1* | 8/2011 | Tuzel ............... H04N 19/597 |
| | | 382/103 |
| 2013/0156262 A1* | 6/2013 | Taguchi ............... G06T 7/75 |
| | | 382/103 |
| 2013/0188017 A1 | 7/2013 | Ma |
| 2014/0198221 A1* | 7/2014 | Beardsley ............ G01B 7/004 |
| | | 348/175 |
| 2014/0267666 A1 | 9/2014 | Holz |
| 2015/0234382 A1* | 8/2015 | Ju ..................... G01S 7/003 |
| | | 701/23 |
| 2016/0140713 A1 | 5/2016 | Martin |
| 2016/0295196 A1 | 10/2016 | Finn et al. |

FOREIGN PATENT DOCUMENTS

| | | |
|---|---|---|
| WO | 2012048173 A2 | 4/2012 |
| WO | 2015000056 A1 | 1/2015 |

OTHER PUBLICATIONS

Zhengyou Zhang, "Camera Calibration", Emerging Topics in Computer Vision, Jan. 1, 2014, Prentice Hall Professional Technical Reference, Chapter 2, pp. 5-43, XP055281563, ISBN: 978-0-387-31439-6.

Faraz M. Mirzaei et al., "3D Lidar-Camera Intrinsic and Extrinsic Calibration: Observability Analysis and Analytical Least Squares-based Initialization" Jan. 1, 2012, XP055124525.

* cited by examiner

METHOD AND SYSTEM FOR MULTIPLE 3D SENSOR CALIBRATION

BACKGROUND

The present disclosure relates generally to calibrating multiple 3D sensors to each other and, more particularly, to a multiple 3D sensor installation for a passenger conveyance.

Calibration to a world coordinate system for an individual 3D depth sensor, i.e., to any coordinate system different from an inherent sensor-oriented coordinate system, where its intrinsic parameters are already known, e.g., from manufacturer's data, employs at least 4 locations at different, known, (x,y,z) world coordinates. These 4 locations might be of 'found' objects that happen to be in the Field of View (FoV). However, for a professional installation, a portable calibration jig might be carefully emplaced at measured world coordinates, and calibration data of this jig is taken by the 3D depth sensor. With data of the world coordinates ($x_i$, $y_i$, $z_i$) and the corresponding 3D depth sensor observed coordinates, ($u_i$, $v_i$, $d_i$), i=1, ... 4, a transform matrix can be solved to achieve calibration. More than 4 points may be measured for a more robust solution using least squares techniques.

One way to achieve tracking of a potential conveyance passenger is to have one depth sensor with an uninterrupted, unoccluded view from, e.g., a kiosk, to a conveyance, e.g., an elevator car. This is rarely possible due to constraints on the physical space as well as limits to the sensor's FoV. Another approach is to have a few sensors, without overlapping FoVs, and to attempt tracking by re-associating detected potential passengers in the disparate FOVs. This may be difficult to do accurately. Further, accurate arrival time estimation may not be possible without continuous tracking since passenger's speed may vary over time. Finally, tracking may be achieved by having continuous spatial coverage from multiple sensors with overlapping FoVs. This latter approach may require that the sensors have a common understanding of their mutual FoVs which may require potentially laborious and error-prone manual calibration.

An individual sensor's calibration requires determining one or more of the 5 intrinsic and 6 extrinsic sensor parameters. As is well-known, the 5 intrinsic parameters are $f_x$ and $f_y$ (the focal lengths), $x_0$ and $y_0$ (the principle point offsets), and s (the axis skew). This can be thought of as a 2D translation, 2D shear, and 2D scaling. The intrinsic parameters are typically known, e.g., from manufacturer's data, or may be determined by known techniques prior to installation of the sensor. The 6 extrinsic parameters are x, y, z offsets from the origin of a world coordinate system and the pitch, yaw, and roll angles with respect to the coordinate axes.

In any multiple sensor calibration, some of the parameters may be known and only a subset of the total need to be estimated. To estimate k parameters at least k independent measurements must be made in order to have enough data for a well-defined solution. In particular, if two 3D sensors with known intrinsic parameters are independently calibrated to their respective world coordinate systems, then 6 parameters are required in the most general case (3 translations, 3 rotations) to calibrate the sensors to a common coordinate system.

One issue with calibrating multiple 3D sensors with overlapping FoVs is that any observation between two sensors may vary by inaccuracy in their current individual calibration, by differences in time synchronization between the sensors, and by differences in the sensing of an object (particularly when the object has a 3D size such that different aspects are viewed by the different sensors).

One approach is to manually place one or more small, but still detectable, object(s) in the mutual FOV, and, depending on what, if any, a priori mutual calibration information is known, measure locations while the object(s) remain stationary. With a sufficient number of unique measurements a mathematical equation may be solved to determine the mutual calibration. However, this method may be time consuming and manual measurement may introduce errors.

SUMMARY

A method for multiple 3D sensor calibration, the process according to one disclosed non-limiting embodiment of the present disclosure can include calculating a centroid location from spatial measurements for each of a pair of 3D sensors that form a common field of view via a moving object mathematical model; calculating at least one of translation and rotation parameters from the locations of each centroid location; and correcting one of the pair of 3D sensors to a common world coordinate system from at least one of the translation and rotation parameters.

A further embodiment of the present disclosure may include, wherein individually calibrating each of a pair of multiple 3D sensors to world coordinates results in zero relative rotation there between.

A further embodiment of the present disclosure may include synchronizing each of the multiple 3D sensors in time.

A further embodiment of the present disclosure may include synchronizing each of the multiple 3D sensors in time to within 1 frame time.

A further embodiment of the present disclosure may include calculating from the (x, y) locations of the two centroids ($x_1$, y1) and ($x_2$, y2), at least one translation parameter by subtraction.

A further embodiment of the present disclosure may include calculating from the (x, y) locations of the two centroids ($x_1$, y1) and ($x_2$, y2), at least one rotation parameter.

A further embodiment of the present disclosure may include calculating from the (x, y) locations of at least two centroids ($x_1$, $y_1$) and ($x_2$, $y_2$), the translation parameters (dx, dy) by a Least Squares (LS) solution.

A further embodiment of the present disclosure may include, wherein one of the pair of 3D sensors is chosen as governing with respect to the common world coordinate system.

A further embodiment of the present disclosure may include individually calibrating each of a multiple 3D sensors to world coordinates.

A further embodiment of the present disclosure may include wherein three measurements are performed of common points in response to three translation parameters being unknown.

A further embodiment of the present disclosure may include computing the translation (dz) by finding individual ground planes of each sensor and computing a difference.

A further embodiment of the present disclosure may include using a random sample consensus (RANSAC) algorithm to find a consistent set of points to find each of the individual ground planes.

A further embodiment of the present disclosure may include wherein six measurements are performed of common points in response to three rotation and three translation parameters being unknown.

A further embodiment of the present disclosure may include using a top and a bottom of a moving object and a separation between the top and the bottom of the moving object when the three rotation and three translation parameters are unknown.

A further embodiment of the present disclosure may include wherein an object mathematical model is employed to estimate the common centroid location.

A further embodiment of the present disclosure may include wherein the object mathematical model is an elliptical cross-section mathematical model.

A further embodiment of the present disclosure may include wherein the object mathematical model is an elliptical cross-section person mathematical model.

A further embodiment of the present disclosure may include wherein the object mathematical model is a full 3D person shape mathematical model.

A sensor calibration system for a passenger conveyance system according to one disclosed non-limiting embodiment of the present disclosure can include multiple sensors with at least one overlapping field of view; a processing module in communication with the multiple sensors, the processing module including a moving object mathematical model operable to estimate a common centroid location to compute translation parameters from the locations of each centroid location to facilitate correction of at least one of the pair of 3D sensors to a common world coordinate system from the translation parameters.

A further embodiment of the present disclosure may include wherein the object mathematical model is an elliptical cross-section mathematical model.

A further embodiment of the present disclosure may include wherein the object mathematical model is a full 3D person shape mathematical model.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
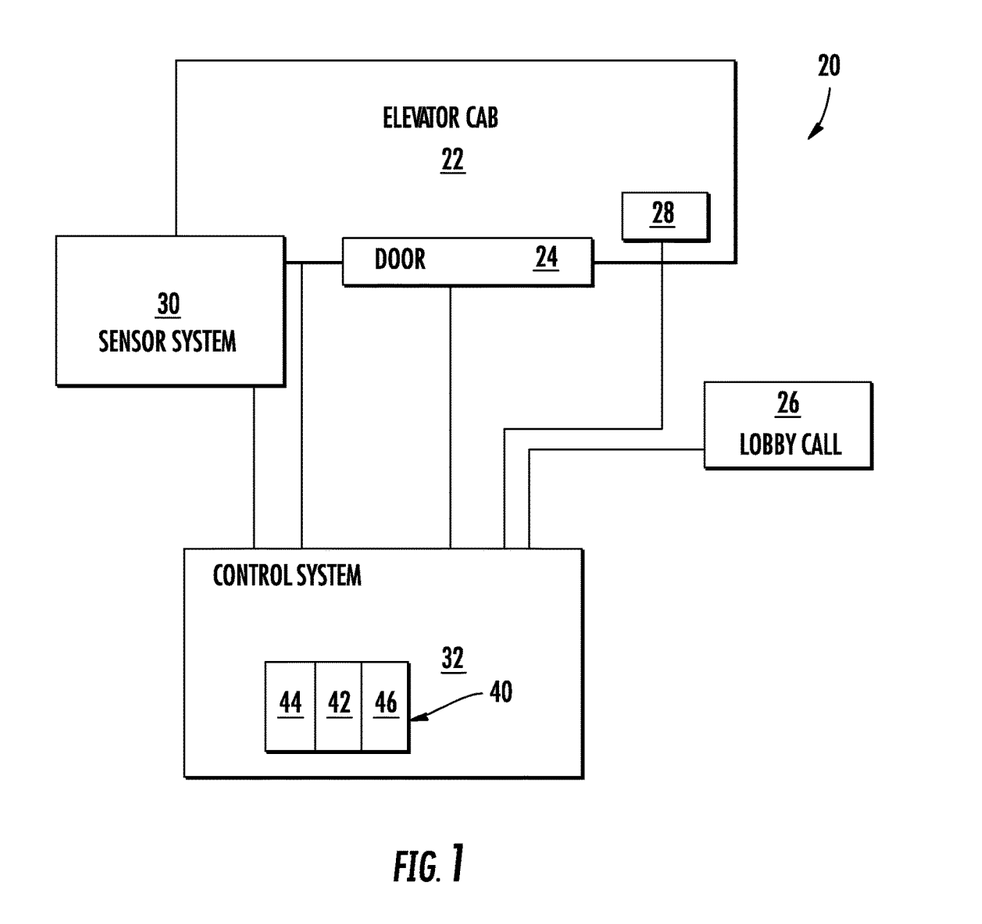
FIG. 1 is a schematic view of an elevator system according to one disclosed non-limiting embodiment.

FIG. 1 schematically illustrates a passenger conveyance system 20 such as an elevator system. The system 20 can include an elevator car 22, an elevator door 24, a lobby call 26, a car-operating panel (COP) 28, a sensor system 30, and a control system 32. It should be appreciated that although an elevator system is disclosed and illustrated as an example herein, other systems such as mass transit vehicles will also benefit herefrom. The calibration of any multi-3D-sensor situation will benefit herefrom, not just passenger conveyances, for instance, a one-floor convention center where there are 3D sensors everywhere for tracking people moving around the building. In fact, one benefit of multiple sensors is in building-wide contexts, rather than in the local area around an elevator where a single sensor might be sufficient. It should be further appreciated that although particular systems are separately defined, each or any of the systems can include otherwise combined or separated via hardware and/or software.

Various elevator systems can utilize a passenger initiated input to signal the need for elevator service. For example, input from the lobby call 26 may include a push button, e.g., up, down, or a desired destination, e.g., floor number, to request elevator service. The passenger initiated input (e.g., via a call button) may notify the control system 32 of the presence of a passenger awaiting elevator service. In response, the control system 32 may dispatch the elevator car 22 to the appropriate floor. Optionally, once inside the elevator car 22, the passenger may push a button on the car-operating panel (COP) 28 designating the desired destination, direction, or the like, and then the control system 32 may dispatch the elevator car 22 to that destination.

The control system 32 can include a control module 40 with a processor 42, a memory 44, and an interface 46. The control module 40 can include a portion of a central control, a stand-alone unit, or other system such as a cloud-based system. The processor 42 can include any type of microprocessor or other processor having desired performance characteristics. The memory 44 may include any type of computer readable medium that stores the data and control processes disclosed herein. That is, the memory 44 is an example computer storage media that can have embodied thereon computer-useable instructions such as a process that, when executed, can perform a desired method. The interface 46 of the control module 40 can facilitate communication between the control module 40 and other systems.

Figure 2:
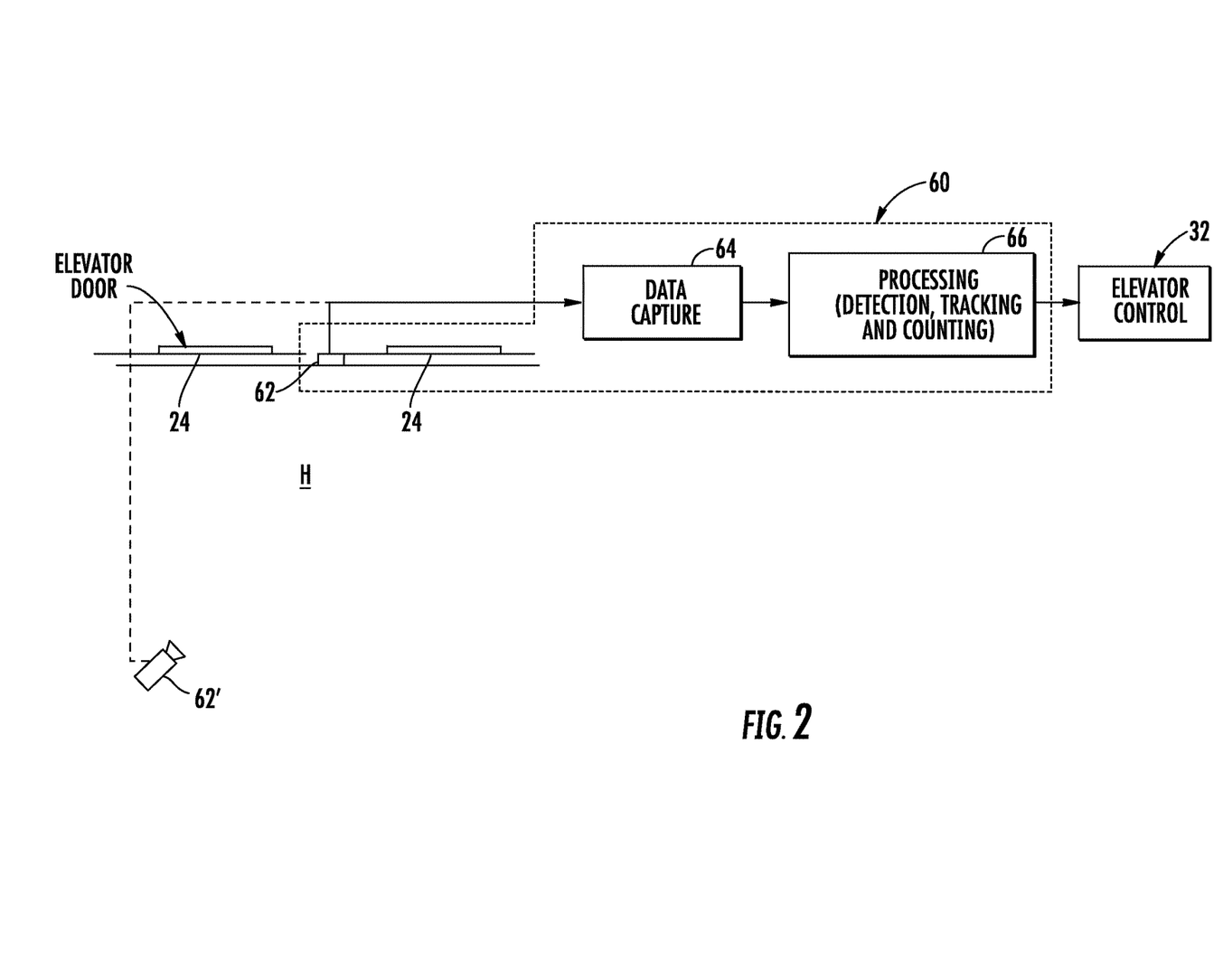
FIG. 2 is a block diagram of an elevator system according to another disclosed non-limiting embodiment.

With reference to FIG. 2, a depth-sensor-based passenger sensing system 60 can include multiple sensors 62, 62' with overlapping fields of view that communicate with a data capture module 64, and a processing module 66. The depth-sensor based passenger sensing system 60 can be a portion of the control system 32, a stand-alone unit, or other system such as a cloud-based system in communication with the control system 32.

Figure 3:
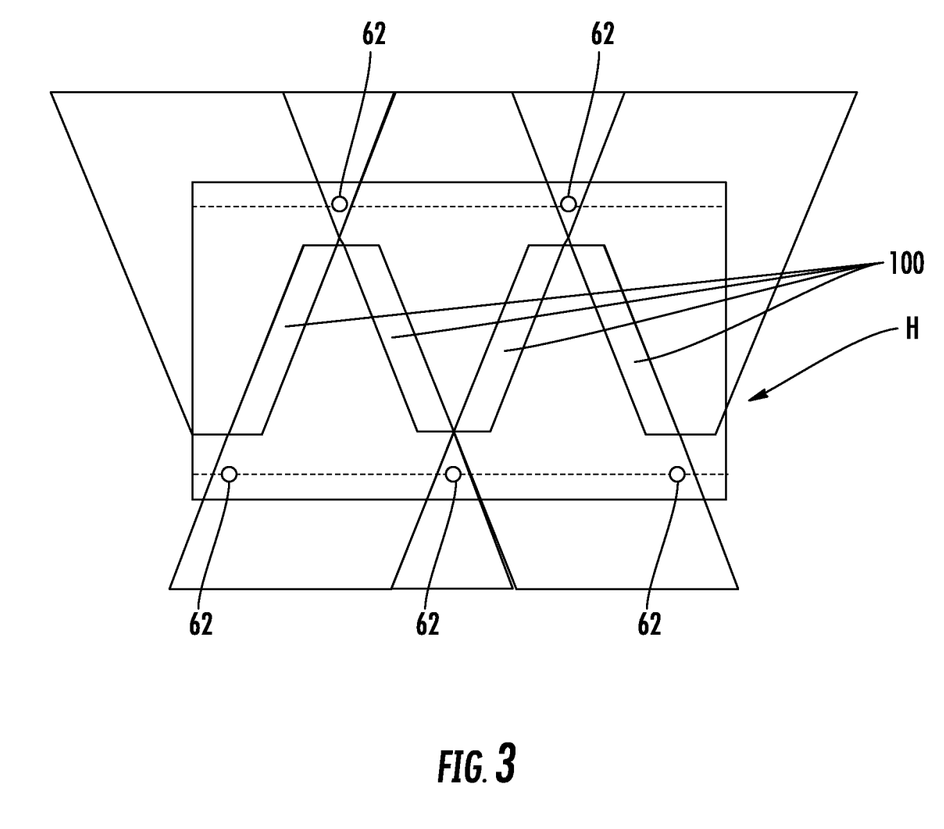
FIG. 3 is a schematic view of multiple sensors' FoVs.

The data capture module 64 and the processing module 66 can be specific to, or embedded in, the multiple sensors 62, 62' to acquire and process the data therefrom. In one example, the multiple sensors 62, 62', through the data capture module 64 and the processing module 66, are operable to obtain depth map data of the lobby H. The depth map data from the multiple sensors 62, 62' may encompass an area beyond lobby H, e.g., of connected hallways, approaches, conveyances, or other public-access areas of a building. From the depth map data, processing 66 may determine the presence of a potential passenger in the depth data, the probability that a potential passenger will become an actual passenger, an estimated time of arrival (ETA) of the potential passenger at any location in the collective FoV of sensors 62, 62', a number of potential passengers in the lobby H, etc. The multiple sensors 62, 62', according to one disclosed non-limiting embodiment, can be installed in a lobby H (FIG. 3). Each of the multiple sensors 62, 62' in this disclosed non-limiting embodiment is a 3D depth-sensing sensor. It should be appreciated that the term "sensor," is used throughout this disclosure for a sensor producing one or more depth map(s) in 1D, 2D, 3D, or combination thereof. Such a sensor can be operable in the electromagnetic or acoustic spectrum capable of producing a depth map (also known as a point cloud or occupancy grid) of the corresponding dimension(s). Various depth sensing sensor technologies and devices include, but are not limited to, a structured light measurement, phase shift measurement, time of flight measurement, stereo triangulation device, sheet of light triangulation device, light field cameras, coded aperture cameras, computational imaging techniques, simultaneous localization and mapping (SLAM), imaging radar, imaging sonar, laser radar, scanning LIDAR, flash LIDAR, Passive Infrared (PR) sensor, and small Focal Plane Array (FPA), or a combination comprising at least one of the foregoing. Different technologies can include active (transmitting and receiving a signal) or passive (only receiving a signal) and may operate in a band of the electromagnetic or acoustic spectrum such as visual, infrared, etc. The use of depth sensing can have specific advantages over conventional 2D imaging. The use of infrared sensing can have specific benefits over visible spectrum imaging such that alternatively, or additionally, the sensor can be an infrared sensor with one or more pixels of spatial resolution, e.g., a Passive Infrared (PR) sensor or an IR Focal Plane Array (FPA).

In 2D imaging, the reflected color (mixture of wavelengths) from the first object in each radial direction from the imager is captured. The 2D image, then, is the combined spectrum of the source illumination and the spectral reflectivity of objects in the scene. A 2D image can be interpreted by a person as a picture. In 1D, 2D, or 3D depth-sensing sensors, there is no color (spectral) information; rather, the distance (depth, range) to the first reflective object in a radial direction (1D) or directions (2D) from the sensor is captured. 1D, 2D, and 3D depth sensing technologies may have inherent maximum detectable range limits and can be of relatively lower spatial resolution than typical 2D imagers. The use of 1D, 2D, or 3D depth sensing can advantageously provide improved operations compared to conventional 2D imaging in their relative immunity to ambient lighting problems, better separation of occluding objects, and better privacy protection. For example, a 2D image may not be converted into a depth map nor may a depth map be converted into a 2D image. Although an artificial assignment of contiguous colors or grayscale to contiguous depths may allow a person to crudely interpret a depth map somewhat akin to how a person sees a 2D image, it is not an image in the conventional sense. This inability to convert a depth map into an image might seem a deficiency, but it can be advantageous in certain analytics applications disclosed herein.

The multiple sensors 62, 62' can be, in one example, an eye-safe line-scan LIDAR in which the field-of-view (FOV) can be, for example, about 180 degrees, which can horizontally cover the entire area of a lobby or other area adjacent to the elevator doors 24 (FIG. 2). The output of the LIDAR may, for example, be a 2D horizontal scan of the surrounding environment at a height where the multiple sensors 62, 62' are installed. For an active sensor, each data point in the scan represents the reflection of a physical object point in the FOV, from which range and horizontal angle to that object point can be obtained. The scanning rate of LIDAR can be, for example, 50 ms per scan, which facilitates a reliable track of a passenger. That is, before application of analytic processes via the processing module 66, the LIDAR scan data can be converted to an occupancy grid representation. Each grid represents a small region, e.g., 5 cm×5 cm. The status of the grid can be indicated digitally, e.g., 1 or 0, to indicate whether each grid square is occupied. Thus, each data scan can be converted to a binary map and these maps then used to learn a background mathematical model of the lobby, e.g. by using processes designed or modified for depth data such as a Gaussian Mixture Mathematical model (GMM) process, principal component analysis (PCA) process, a codebook process, or a combination including at least one of the foregoing. The multiple sensors 62, 62' can be, in another example, be a 2D eye-safe time-of-flight depth sensor or structured light sensor which outputs a 3D volumetric scan of the surrounding environment.

The processing module 66 may utilize various 3D detection and tracking processes (disclosed elsewhere herein) such as background subtraction, spurious data filtering, and Kalman Filtering that can make the system more accurate. In particular, spurious data can be inherent to depth sensing and may vary with the particular technology employed. For active techniques, where a particular signal is emitted and subsequently detected to determine depth, (e.g., structured light, time of flight, LIDAR, and the like) highly reflective surfaces may produce spurious depth data, e.g., not the depth of the reflective surface itself, but of a diffuse reflective surface at a depth that is the depth to the reflective surface plus the depth from the reflective surface to some diffusely reflective surface. Highly diffuse surfaces may not reflect a sufficient amount of the transmitted signal to determine depth, which may result in spurious gaps in the depth map. Even further, variations in ambient lighting, interference with other active depth sensors or inaccuracies in the signal processing may result in spurious data.

With reference to FIG. 3, the multiple sensors 62 (five shown, mounted to walls denoted by dotted lines) include multiple common FOVs 100. The common FOVs 100 (four shown, the small overlap directly in front of each sensor is negligibly small) may be utilized to automatically determine the mutual calibration parameters by joint estimation techniques.

The specific mathematical approach to computing a transformation matrix for calibration varies by which parameters need to be estimated. Common to each approach is (i) manual initiation of a calibration mode, for instance by an installer, or automatic detection of the need for calibration (ii) automatically gathering sufficient information by simultaneous measurement with the multiple sensors of a moving object, e.g., a person walking in the common FoVs 100, (iii) automatically computing the unknown calibration parameters by use of a mathematical model of the moving object, e.g., a person has an elliptical cross-section such that a hemi-ellipse is visible to each sensor, E1 E2 (FIGS. 4 and 5), and (iv) an automatically exiting calibration mode.

Figure 6:
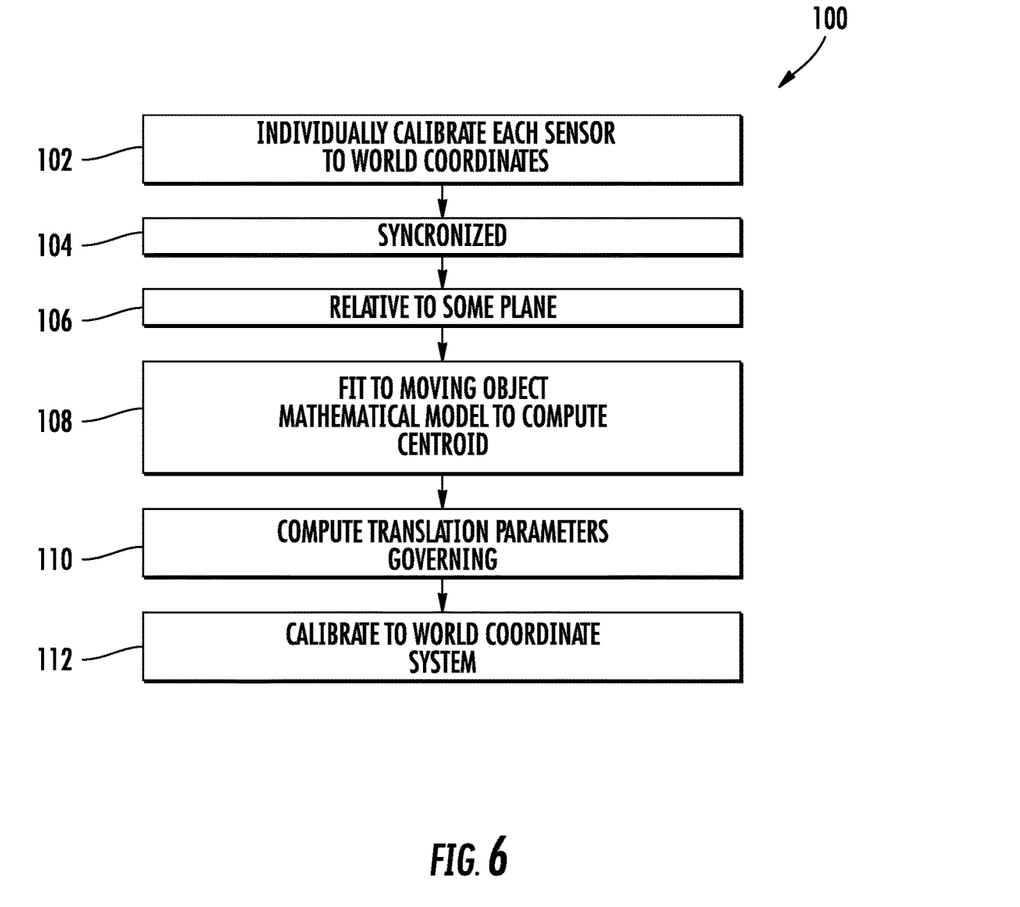
FIG. 6 is a block diagram of a 3D sensor calibration process according to one disclosed non-limiting embodiment.

With reference to FIG. 6, in one embodiment of a method 100 for multiple 3D sensor calibration, the multiple sensors 62, 62' are mounted and initially individually accurately calibrated to individual world coordinate systems via known techniques, where the relative pitch, yaw, and roll between the multiple sensors 62, 62' are zero (Step 102). Next, the individual sensors 62, 62' are synchronized in time to within 1 depth map sample time (also sometimes called a "frame time" or just a "frame"), preferably less than or equal to $\frac{1}{25}^{th}$ of a second, whereby the depth map sample time is small enough that moving objects are approximately stationary during the sample time (Step 104). If sensors 62, 62' have internet access, this may be achieved by using the NetTime synchronization client, or the like. In the case where a priori synchronization is not possible, a time difference between sensors may be computed, e.g., as the time when the centroids of the separate views of an object are closest together in world coordinates. This time difference may then be used as a temporal offset to synchronize the multiple sensors 62, 62'. Other approaches to computing a time difference are possible such as including the time difference in an optimization formulation, and the like.

Figure 4:
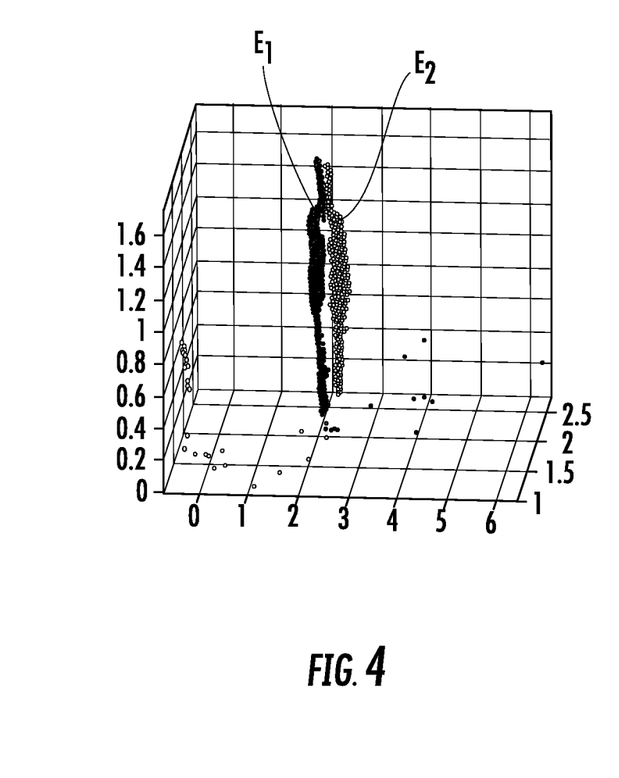
FIGS. 4-5 are 3D point clouds from two depth sensors of 1 person.
Figure 5:
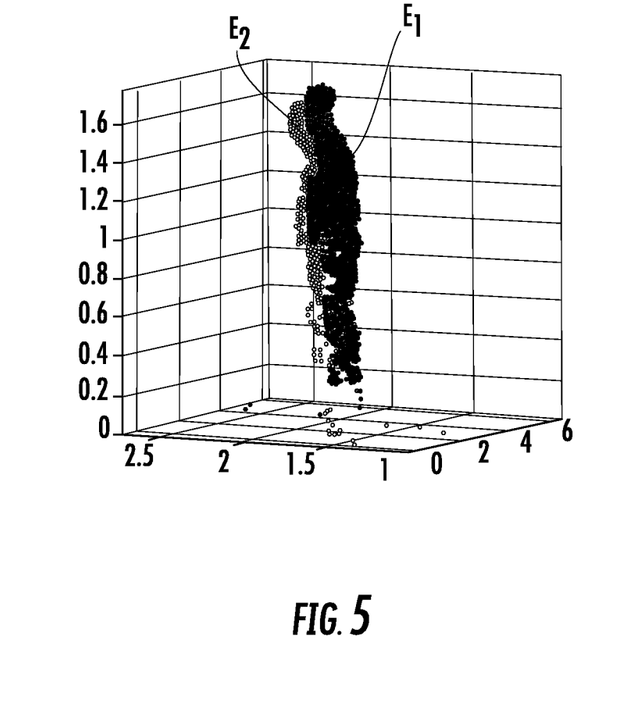

The individual sensors 62, 62' may be mounted at the same height relative to the same floor (Step 106). There are, then, only two offset parameters (dx, dy) between any pair of sensors 62, 62' to estimate from measured data. Given an object that moves through the common FoV of each pair of sensors 62, 62', each sensor 62, 62' may see the object in a different pose due to their disparate mounting locations (FIGS. 4 and 5).

The detection and tracking of objects in one of sensors 62, 62' depth data may be achieved by a process of determining a background, subtracting the background for foreground object detection, morphological operations, geometric filtering, and Bayesian Filter tracking.

A depth background can be computed which can be used to segment foreground objects, e.g., a passenger, luggage, etc., from the background, e.g., walls and floors, via a code-book model, Gaussian Mixture Model, Non-Gaussian Mixture Model, PCA, and the like. It should be appreciated that the depth data may alternatively be referred to as a depth map, point cloud, or occupancy grid. The depth data may be relatively "noisy." In particular, the depth uncertainty (noise) can be an analytical function of range and therefore the depth data error (noise) can be discontinuous (or not approximately continuous), and the depth distribution can be non-Gaussian. The background model may be subtracted from the current depth data to determine a foreground detection.

After background subtraction and foreground detection, morphological operations may be used to remove isolated small foreground regions (e.g., which can also be "noise") and to segment moving objects, called blobs, for further analysis. However, a 3D extension of 2D connected components may be inappropriate since the 3D data still has self-occlusion, e.g., "shadows" in an occupancy grid. An approach to this filtering may include extension of a 2D connected components process to include an "unknown" category in the occupancy grid for 3D morphological filtering. Next, size filtering can be performed as a function of range which may remove objects below a predetermined size. The objects can then be segmented in 3D based on depth discontinuity. It is possible that some objects after depth discontinuity segmentation will be relatively small, e.g., someone almost entirely occluded by another person will appear as a small blob. This approach can be used to track such small objects so they can be classified rather than filtering them out. Morphological filtering can be used to remove a blob if selected characteristics, such as height, width, aspect ratio, volume, acceleration, velocity, and/or other spatiotemporal characteristics are outside a detection threshold (e.g., dynamically calculated threshold, static threshold, or the like).

Geometric filtering can be applied to further remove spurious blobs outside the scene boundary. The depth background defines a 3D scene boundary of the environment. A blob representing a real object should be within the 3D boundary. That is, if a blob's depth is larger than the depth of the corresponding location of the depth background, then the blob is outside of the 3D boundary and can be removed, e.g., a blob detected from reflective surfaces such as a mirror.

Passenger tracking may be based on the filtered detected foreground using a Bayesian Filter method such as a Kalman Filter or a Particle Filter. Based on detection, and tracking, potential passenger data such as the presence of a passenger in the lobby, a count of potential passengers, an estimated time of arrival (ETA) for each potential passenger, and a number of waiting passengers can be obtained. These may be in metric units as the result of individual sensor 62, 62' calibration to world coordinates in metric units. In this context, metric units are not limited to those of the International System of Units (SI), also known as the Metric System, but denote any mensuration units readily convertible to Metric System units.

Referring now to FIGS. 4 and 5, two different poses of a detected person are shown (FIGS. 4 and 5) from the perspective of two depth sensors (representative point clouds, respectively). In FIG. 4 the person is turned somewhat to his left and in FIG. 5 the person is turned to his right. The respective point clouds are substantially separated in space because of the pose of the person, mounting locations of the sensors, and the physics of depth sensing. As a consequence, neither sensor has a common spatial location for the commonly sensed spatial object.

Referring again to FIG. 6, a centroid location of the object's depth data may be computed (Step 108) based on the depth data from each sensor 62, 62' for each frame. To achieve the necessary independent measurements, different frames of depth data are taken at different times as the object moves. That the depth data is independent may be verified by comparison of a first computed object's location to a second computed object's location. If the moving object has significant volume such that the multiple depth sensors 62, 62' receive returns from different sides of the object, an object mathematical model may be employed to estimate single common object location such as a centroid location. Therefore since a person typically has a significant volume, preferably the object's depth data are fit to a moving object mathematical model, e.g., a 3D person mathematical model, which facilitates determining common (x,y) locations of the person. A 3D person mathematical model may be a circular cross-section cylinder (the non-circular dimension of the cylinder aligned with the person's height), elliptical cross-section cylinder (the non-elliptical dimension of the cylinder aligned with the person's height), 3D ellipse, or more complicated human shape model. Alternatively, fitting a hemi-3D-ellipse to each sensor's depth data may be utilized.

From the (x, y) locations of at least two centroids $(x_1, y_1)$ and $(x_2, y_2)$, as the person moves the translation parameters (dx, dy) can be computed by simple subtraction 110. From more than two measurements, a more accurate Least Squares (LS) solution can be computed. Without loss of generality, one world coordinate system may be chosen as governing and the other can be corrected by (dx, dy) to calibrate to a common world coordinate system (Step 112).

In an alternative embodiment, where the sensors are not mounted at the same height relative to a common floor, but the relative pitch, yaw, and roll are still zero, all three translation parameters (dx, dy, dz) are unknown, and three independent measurements are required of a common centroid. Because of possible obscuration, or the object being only partially in the FoV, a top or a bottom of the object may be utilized as a target. Alternatively, the two-parameter approach may be used and, even without a moving object, the translation (dz) can be computed by finding individual ground planes of each sensor and computing the difference. To find a ground plane, a plane (2D surface z=mx+py+b where m, p, and b are the parameters) in depth (3D) data can be found by finding n consistent points and solving equation $$\begin{bmatrix} \sum_{i=1}^{n} x_i^2 & \sum_{i=1}^{n} x_i y_i & n\bar{x} \\ \sum_{i=1}^{n} x_i y_i & \sum_{i=1}^{n} y_i^2 & n\bar{y} \\ \bar{x} & \bar{y} & 1 \end{bmatrix} \begin{bmatrix} m \\ p \\ b \end{bmatrix} = \begin{bmatrix} \sum_{i=1}^{n} x_i z_i \\ \sum_{i=1}^{n} y_i z_i \\ \bar{z} \end{bmatrix} \quad (1)$$

Since there may be many planes in the data (walls, floors, etc.), a random sample consensus (RANSAC) algorithm may alternatively or additionally be used to find a consistent sets of points. Additional logic may be used to distinguish which plane is the floor. Such additional logic might consist of determining which plane has the largest extent, which plane is in contact with the lowest extreme of the moving object, etc.

In yet another alternative embodiment the multiple sensors 62, 62' may not be mounted with zero relative pitch, yaw, and roll in addition to not knowing the translation parameters (dx, dy, dz). In this case, all six offset and rotation parameters are unknown, and at least six independent measurements are required. In order to achieve measurement independence for one moving object, e.g., a person, the top and bottom, as well as the separation (constant height) are utilized from multiple frames of depth data.

To compute all six unknown parameters, a mathematical equation may be formulated as $Ts_1=s_2$ where s1 is a point on an object in one sensor's coordinate system and s2 is the corresponding point in another sensor's coordinate system, where the correspondence is that the points are the centroid of one object in the sensor's common FoV. T, in homogeneous coordinates, is the desired transformation matrix comprising the rotations and translations between the coordinate systems.

The method 100 provides for multiple 3D sensor calibration with minimal or no installer effort. That is, the installer does not need special calibration targets nor needs to take measurements in both sensor and world coordinate systems.

The elements disclosed and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

It should be appreciated that relative positional terms such as "forward," "aft," "upper," "lower," "above," "below," "bottom", "top", and the like are with reference to the normal operational attitude and should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, disclosed, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically disclosed. For that reason the appended claims should be studied to determine true scope and content.

What is claimed is:

1. A method for multiple 3D sensor calibration without taking measurements in sensor and world coordinate systems, the process comprising:
   calculating a centroid location from spatial measurements for each of a pair of 3D sensors that form a common field of view via a moving object mathematical model;
   calculating at least one of translation and rotation parameters from the locations of each centroid location;
   synchronizing each of the 3D sensors in time; and
   correcting one of the pair of 3D sensors to a common world coordinate system from at least one of the translation and rotation parameters.

2. The method as recited in claim 1, wherein individually calibrating each of a pair of multiple 3D sensors to world coordinates results in zero relative rotation there between.

3. The method as recited in claim 1, further comprising synchronizing each of the multiple 3D sensors in time comprises synchronizing to within 1 frame time.

4. The method as recited in claim 1, further comprising calculating from the (x, y) locations of the two centroids ($x_1$, y1) and ($x_2$, y2), at least one translation parameter by subtraction.

5. The method as recited in claim 1, further comprising calculating from the (x, y) locations of the two centroids ($x_1$, y1) and ($x_2$, y2), at least one rotation parameter.

6. The method as recited in claim 1, further comprising calculating from the (x, y) locations of at least two centroids ($x_1$,$y_1$) and ($x_2$,$y_2$), the translation parameters (dx, dy) by a Least Squares (LS) solution.

7. The method as recited in claim 1, wherein one of the pair of 3D sensors is chosen as governing with respect to the common world coordinate system.

8. The method as recited in claim 1, further comprising individually calibrating each of a multiple 3D sensors to world coordinates.

9. The method as recited in claim 1, wherein three measurements are performed of a common point in response to three translation parameters being unknown.

10. The method as recited in claim 1, further comprising calculating the translation (dz) by finding individual ground planes of each sensor and computing a difference.

11. The method as recited in claim 10, further comprising using a random sample consensus (RANSAC) algorithm to find a consistent set of points to find each of the individual ground planes.

12. The method as recited in claim 1, wherein six measurements are performed of a common point in response to three rotation and three translation parameters being unknown.

13. The method as recited in claim 12, further comprising using a top and a bottom of a moving object and a separation between the top and the bottom of the moving object when the to three rotation and three translation parameters are unknown.

14. The method as recited in claim 1, wherein an object mathematical model is employed to estimate the common centroid location.

15. The method as recited in claim 14, wherein the object mathematical model is an elliptical cross-section mathematical model.

16. The method as recited in claim 14, wherein the object mathematical model is an elliptical cross-section person mathematical model.

17. The method as recited in claim 14, wherein the object mathematical model is a full 3D person shape mathematical model.

18. The method as recited in claim 1, wherein synchronizing each of the multiple 3D sensors in time comprises synchronizing to within 1 depth map sample time.

19. The method as recited in claim 1, wherein synchronizing each of the multiple 3D sensors in time comprises synchronizing to within $\frac{1}{2}s^{th}$ of a second.

20. The method as recited in claim 1, wherein synchronizing each of the multiple 3D sensors in time comprises synchronizing to within a depth map sample time small enough that moving objects are approximately stationary during the sample time.

21. A sensor calibration system for a passenger conveyance system without taking measurements in both sensor and world coordinate systems, comprising:
a multiple of sensors with at least one overlapping field of view;
a processing module in communication with the multiple sensors, the processing module including a moving object mathematical model operable to estimate a common centroid location to compute translation parameters from the locations of each centroid location to facilitate correction of at least one of the pair of 3D sensors to a common world coordinate system from the translation parameters, each of the multiple of 3D sensors synchronized in time.

22. The system as recited in claim 21, wherein the object mathematical model is an elliptical cross-section mathematical model.

23. The system as recited in claim 21, wherein the object mathematical model is a full 3D person shape mathematical model.

24. The system as recited in claim 21, wherein each of the multiple of sensors generate a depth map in 1D, 2D, 3D, or a combination thereof.

* * * * *